United States Patent
Chen et al.

(10) Patent No.: US 8,869,290 B2
(45) Date of Patent: Oct. 21, 2014

(54) METHOD AND SYSTEM FOR SECURE CONTENT DISTRIBUTION BY A BROADBAND GATEWAY

(75) Inventors: Xuemin Chen, Rancho Santa Fe, CA (US); Jeyhan Karaoguz, Irvine, CA (US); Wael Diab, San Francisco, CA (US); David Garrett, Tustin, CA (US); David Albert Lundgren, Mill Valley, CA (US); Rich Prodan, Niwot, CO (US)

(73) Assignee: Broadcom Corporation, Irvine, CA (US)

(*) Notice: Subject to any disclaimer, the term of this patent is extended or adjusted under 35 U.S.C. 154(b) by 307 days.

(21) Appl. No.: 12/982,331

(22) Filed: Dec. 30, 2010

(65) Prior Publication Data

US 2011/0302624 A1    Dec. 8, 2011

Related U.S. Application Data

(60) Provisional application No. 61/351,696, filed on Jun. 4, 2010.

(51) Int. Cl.
| | |
|---|---|
| *G06F 21/10* | (2013.01) |
| *G06Q 40/00* | (2012.01) |
| *G06Q 30/04* | (2012.01) |
| *G06Q 20/10* | (2012.01) |
| *H04L 29/08* | (2006.01) |
| *G06Q 30/02* | (2012.01) |
| *H04L 12/857* | (2013.01) |
| *H04L 12/24* | (2006.01) |

(52) U.S. Cl.
CPC ............ *G06Q 30/0226* (2013.01); *H04L 41/32* (2013.01); *H04L 41/5019* (2013.01); *G06Q 40/12* (2013.01); *G06Q 30/04* (2013.01); *G06Q 20/10* (2013.01); *H04L 67/10* (2013.01); *H04L 47/2491* (2013.01); *G06Q 30/0215* (2013.01)

USPC .................. 726/26; 726/12; 726/27; 726/28; 726/29; 726/31; 713/151; 713/152; 713/155; 713/163

(58) Field of Classification Search
None
See application file for complete search history.

(56) References Cited

U.S. PATENT DOCUMENTS

| 2006/0041891 A1* | 2/2006 | Aaron ............................ 719/315 |
| 2006/0150252 A1* | 7/2006 | Okimoto et al. ................. 726/26 |

(Continued)

FOREIGN PATENT DOCUMENTS

KR    20090058358    *  9/2009   ............. G06F 21/00

*Primary Examiner* — Jung Kim
*Assistant Examiner* — Adrian Stoica
(74) *Attorney, Agent, or Firm* — Foley & Lardner LLP; Christopher J. McKenna; Paul M. H. Pua

(57) ABSTRACT

A broadband gateway, which enables communication with a plurality of devices, handles at least one physical layer connection to at least one corresponding network access service provider. Security boundaries such as conditional access (CA) and/or digital right management (DRM) boundaries associated with the broadband gateway are identified based on security profiles associated with the plurality of devices and/or a service from networks. The identified security boundaries are utilized to determine or negotiate CA information for content access for the service. The received content may be distributed according to the determined CA information and the security profiles of the corresponding devices. The broadband gateway may be automatically and dynamically configured based on the identified security boundaries to secure content distribution to the devices. Content distribution security schemes, for example, super encryption, simul-crypt, IPSec and/or watermarking, may be selected by matching the CA information with corresponding device security profiles.

22 Claims, 6 Drawing Sheets

FIG. 4

(56) References Cited

U.S. PATENT DOCUMENTS

| | | |
|---|---|---|
| 2006/0156416 A1* | 7/2006 | Huotari et al. .................. 726/27 |
| 2006/0242069 A1* | 10/2006 | Peterka et al. .................. 705/50 |
| 2007/0033419 A1* | 2/2007 | Kocher et al. ................. 713/193 |
| 2008/0112405 A1* | 5/2008 | Cholas et al. .................. 370/389 |
| 2008/0134309 A1* | 6/2008 | Qin et al. .......................... 726/6 |
| 2008/0313691 A1* | 12/2008 | Cholas et al. .................. 725/131 |
| 2011/0239287 A1* | 9/2011 | Pak et al. ......................... 726/10 |

* cited by examiner

METHOD AND SYSTEM FOR SECURE CONTENT DISTRIBUTION BY A BROADBAND GATEWAY

CLAIM OF PRIORITY

This patent application makes reference to, claims priority to and claims benefit from U.S. Provisional Patent Application Ser. No. 61/351,696 filed on Jun. 4, 2010.

The above stated application is hereby incorporated herein by reference in its entirety.

INCORPORATION BY REFERENCE

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,933 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/982,429 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/981,414 filed on Dec. 30, 2010; and
U.S. patent application Ser. No. 12/981,733 filed on Dec. 30, 2010.

FIELD OF THE INVENTION

Certain embodiments of the invention relate to broadband gateways. More specifically, certain embodiments of the invention relate to a method and system for secure content distribution by a broadband gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB connected to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for secure content distribution by a broadband gateway, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for secure content distribution by a broadband gateway. In various embodiments of the invention, a broadband gateway, which enables communication with a plurality of devices, is operable to handle at least one physical layer connection to at least one corresponding network access service provider. In this regard, the at least one physical layer connection may comprise a plurality of physical layer connections and the at least one corresponding network access service provider may comprise a plurality of access service providers. Each of the plurality of physical layer connections corresponds to a respective one of the plurality of corresponding access service providers. The broadband gateway may identify associated security boundaries based on security profiles supported by the plurality of devices and/or a service profile associated with a service provided by the at least one network access service provider. The identified security profiles may specify or comprise security levels for each of security functions, for example, a key/certificate function and/or a content encryption/decryption function. The identified security boundaries may comprise overall boundary information about conditional access, digital right management, link protection, authentication and/or device intrusion. The broadband gateway may utilize the identified security boundaries to determine or negotiate conditional access (CA) information for access to the service. Content for the service from the at least one network access service provider may be received by the broadband gateway utilizing the determined CA information. The broadband gateway may distribute the received content to the devices based on the determined CA information and the security profiles supported by the corresponding devices. In this regard, content distribution security schemes such as, for example, super encryption, simul-crypt and/or IPSec, may be determined by matching the CA information with the corresponding security profiles for the devices. The broadband gateway may distribute the received content to the devices utilizing the corresponding determined content distribution schemes. The broadband gateway may be automatically and dynamically configured based on the identified security boundaries to secure content distribution in the home network.

Figure 1:
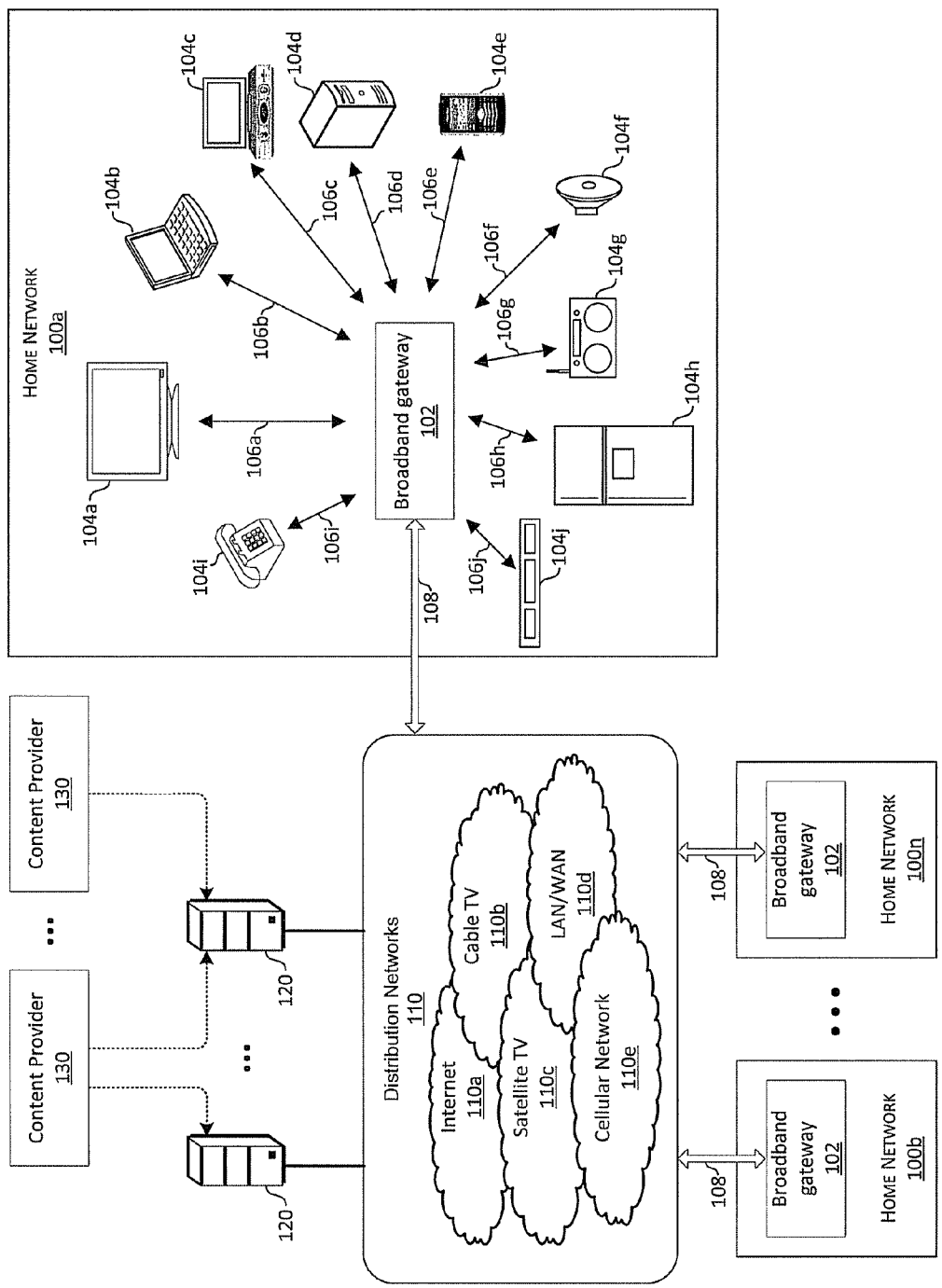
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100a may be serviced by a broadband gateway 102. Also shown in FIG. 1 are additional home networks 100b, . . . , 100n. Each of the home networks 100b, 100n may also be serviced by a broadband gateway 102.

The service providers 120 may comprise various entities which may provide various services using different access technologies to devices 104 via the gateway 102 and/or to the gateway 102 itself. The services may include, but are not limited to, multimedia, television, Internet, phone, Ethernet, multimedia over coax alliance (MoCA), passive optical network (PON), and/or cellular services, for example. Some of the service providers 120 may comprise network access service providers which provide physical layer connections to the gateway 102. Such physical layer connections may then be utilized to access, and/or may be part of, the distribution networks 110. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers.

The content providers 130 may generate, capture, and/or package content, such as multimedia content, that may be distributed to end-users. The content may comprise, for example, audio, video, e-book, gaming, and/or other content. The content may be, for example, downloadable and/or streaming, rented and/or purchased. In some instances, a content provider and a service provider may be separate. In some instances, as indicated by the dashed line 106, a single provider may provide both content and services. For example, an entity that functions as a network access service provider may also provide content and/or services other than network access and, thus, that entity may also be accurately referred to as a "content provider" and/or a "service provider." Content and/or services that are provided by a content provider 130 and/or a service provider 120 may be provided to the gateway 110 via a physical layer connection provided by a network access service provider 120.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices 104 which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the service providers 120 (and/or the content providers 130) via the distribution networks 110.

The broadband gateway 102 may comprise suitable logic, circuitry, interfaces, and/or code that may be operable to provide connectivity between one or more devices in a home network, such as the home network 100a, and a plurality of external networks. For example, the broadband gateway 102 may handle a plurality of broadband physical layer connections 108 to the distribution networks 110. The broadband physical layer connections 108 may comprise wired, optical, and/or wireless connections between the broadband gateway 102 and the distribution networks 110, which may enable communication between the broadband gateway 102 and the service providers 120. The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers, wherein the content may be delivered through one or more services providers. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100, using wired and/or wireless communication links.

A single broadband gateway 102 may be operable to handle multiple physical layer (i.e., layer 1 of the open-systems interconnection model (OSI)) connections 108 to multiple ones, or portions, of the distribution networks 110, where different ones or portions of the distribution network(s) 110 are owned, operated, leased, or otherwise associated with different network access service providers 120. For example, a first network access service provider 120 may provide network access to the gateway 102 via a DSL connection over twisted-pair cabling, and a second network access service provider 120 may provide network access to the gateway 102 via a cable television connection over coaxial cabling. In some instances, the gateway 102 may be operable to concurrently communicate over multiple physical layer connections provided by multiple network access service providers.

The broadband gateway 102 may also be operable to provide and/or support various other, non-content related services in the home network 100. For example, the broadband gateway 102 may be operable to provide energy management in the home network 102, by controlling and/or adjusting configuration of one or more devices in the home network to reduce power consumption for example.

Devices serviced by, and/or connected with the broadband gateway 102 may comprise content consuming devices and/or other, non-content consuming household or home devices that may be operable to interact with the broadband gateway 102. For example, the broadband gateway 102 may service, and/or may communicate with a plurality of home devices 104a-104j in the home network 100a. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, a phone 104h, an appliance 104i (e.g., refrigerator), and a digital video recorder (DVR) or personal video recorder (PVR) 104j. The broadband gateway 102 may interact with each of the home devices 104a-104j via links 106a-106j, which may be supported by the broadband gateway 102 and the corresponding home device. For example, the link 106a between the broadband gateway 102 and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a phone line. The link 106i may comprise, for example, a wired or wireless Ethernet link. The link 106j may comprise, for example, a wired or a wireless link.

In the exemplary embodiment of the invention illustrated in FIG. 1, although the devices 104a-104j may communicate with only the broadband gateway 102 as shown, the invention may not be so limited. Accordingly, the devices 104a-104j may communicate with multiple broadband gateways in a local or home network without departing from the spirit and scope of various embodiments of the invention.

As illustrated in FIG. 1, a plurality of home networks 100b, . . . 100n, may also be connected to the distribution networks 110. These home networks 100b, . . . 100n may operate in substantially the same manner as the home network 100a. By having multiple home networks connected to the distribution networks 110, various applications, such as peer-to-peer communication and/or data aggregation operations may be possible by utilizing the broadband gateways 102 in the home networks.

In operation, one or more of the devices 104a-104j may request that content for a requested service be delivered to it via the broadband gateway 102. In an embodiment of the invention, the broadband gateway 102 may be operable to identify or discover security profiles associated with the corresponding requesting devices 104a-104j based on, for example, device types. A security profile for a device such as the device 104a may specify a security level for each security component or function employed within the device 104a. A plurality of security components or functions such as, for example, a key/certificate management function, a content encryption/decryption function, and/or a content encoding/decoding function, may be implemented or employed within the device 104a. Depending on device configuration, each security function within the device 104a may be associated with a different security level. The identified security profiles for the corresponding requesting devices 104 may be utilized to determine or update security boundaries for the broadband gateway 102. The determined security boundaries may comprise information about boundaries on conditional access, digital right management, link protection, authentication, and/or device intrusion.

In an embodiment of the invention, the broadband gateway 102, upon being connected or linked to networks, may subscribe itself for various services provided by the service providers 120. In this regard, the broadband gateway 102 may be operable to negotiate conditional access (CA) information with the service providers 120 for access to corresponding services based on the associated security boundaries. The CA information may comprise certain criteria that need to be met before granting access to content of the corresponding requested services. The broadband gateway 102 may form or create its own service security profile utilizing the negotiated or agreed CA information. In instances where a service is desirable to one or more devices 104, the broadband gateway 102 may communicate with the service providers 120 to request, as a service subscriber, the desirable service utilizing its own service security profile. The service providers 120 may verify whether the broadband gateway 102 is a valid subscriber for the requested service. In instances where the broadband gateway 102 is a valid subscriber for the requested service, the service providers 120 may encrypt content for the requested service utilizing corresponding CA information. The resulting encrypted content may be communicated or delivered to the broadband gateway 102 via the distribution networks 110. The broadband gateway 102 may receive the encrypted content for the requested service from the service providers 120 utilizing the corresponding CA information.

In an embodiment of the invention, the broadband gateway 102 may be operable to secure content distribution to one or more served devices such as the devices 104. For example, the broadband gateway 102 may receive encrypted content for a service provided by the service providers 120. The broadband gateway 102 may compare or match the CA information associated with the received encrypted content with corresponding security profiles for the devices 104. Various content distribution security schemes such as, for example, super encryption, simul-crypt, secure IP encryption (IPSec) and secure watermarking may be determined based on the comparison and may be utilized to secure content distribution to the corresponding devices 104.

Super encryption is an encryption mechanism that provides double or super encrypted content. For example, the service providers 120 may encrypt content for a service requested by the broadband gateway 102 utilizing corresponding CA information. The encrypted content may be delivered or communicated to the broadband gateway 102 via the distribution networks 110. The broadband gateway 102, before delivering the received encrypted content to the device 104a, for example, may encrypt the received encrypted content based on the security profile for the device 104a. The broadband gateway 102 may deliver or communicate the resulting double or super encrypted content to the device 104a for the requested service.

Simul-crypt is a process that allows devices such as the devices 104a-104j associated with different security profiles to access the same content for a requested service provided by the service providers 120. In this regard, the broadband gateway 102 may be operable to provide or employ different CA information on the same received content for the requested service. The broadband gateway 102 may simultaneously broadcast the different CA information employed for the same received content. The devices 104a-104j may pick or choose a proper encryption algorithm from the broadcasted CA information to receive and decrypt the corresponding content.

IPSec is a network layer protocol that may be implemented by extending the IP packet header utilizing, for example, additional protocol numbers. The broadband gateway 102 may utilize IPSec to support authentication and encryption for secure content distribution in the home network 100a.

Secure watermarking is a technique that may be utilized or applied to protect copyrighted content for secure content distribution in the home network 100a. In this regard, the broadband gateway 102 may be operable to watermark content received for the requested service by embedding data directly into the received content, resulting in imperceptible degradation in quality. The resulting watermarked content may be distributed to the devices 104a-104j when needed.

In an embodiment of the invention, the broadband gateway 102 may dynamically incorporate a removable secure module such as a Card Authenticator (CA) card and/or a downloadable security software for a given service. The broadband gateway 102 may determine associated security boundaries such as, for example, conditional access, digital right management, link protection, authentication, device intrusion based on a security profile associated with the incorporated removable security module for the given service. The broadband gateway 102 may automatically configure content routing information, content process and/or content distribution for the given service based on the determined security boundaries.

Figure 2:
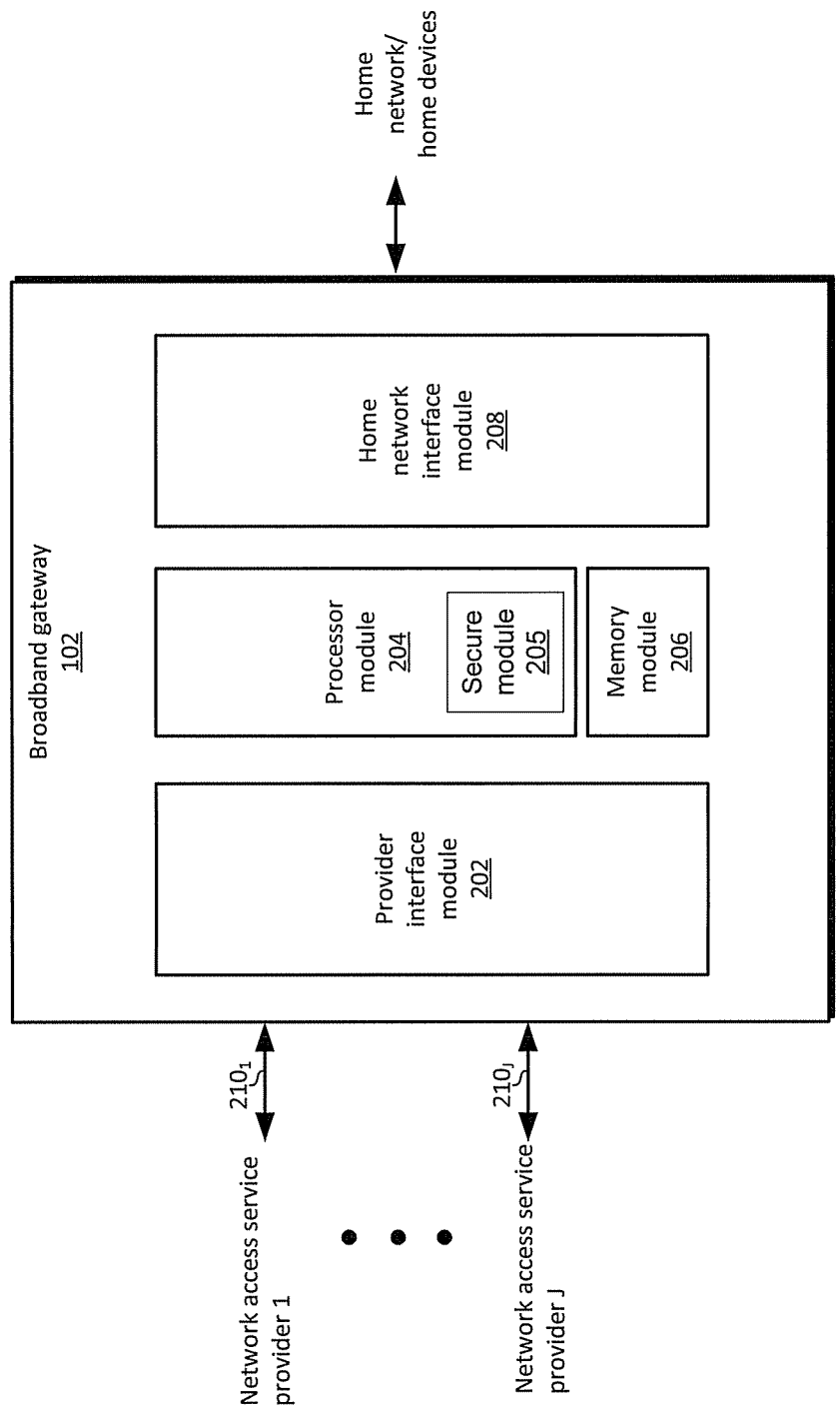
FIG. 2 is a diagram illustrating an exemplary broadband gateway, which may be operable to secure content distribution in a home network, in accordance with an embodiment of the invention.

FIG. 2 is a diagram illustrating an exemplary broadband gateway, which may be operable to secure content distribution in a home network, in accordance with an embodiment of the invention. Referring to FIG. 2, the broadband gateway 102 may comprise suitable logic, circuitry, code, and/or interfaces that may be operable to provide connectivity between one or more networks, such as the distribution networks 110 shown in FIG. 1, for example, and one or more devices in a home network, such as the home devices 104a-104j in the home network 100a shown in FIG. 1.

The broadband gateway 102 may operate as an interface device that allows one or more devices in the home network to access one or more networks, and to access various services and/or content via those one or more networks. For example, the broadband gateway 102 may be utilized to enable interaction between the plurality of service providers 120 and/or the plurality of content providers 130, and the home devices 104a-104j. For example, the broadband gateway 102 may determine or update its own security boundaries based on corresponding security profiles associated with the home devices 104a-104j. The broadband gateway 102, when connected or linked to networks, may negotiate conditional access (CA) information with the service providers 120 and/or the content providers 130 so as to subscribe for various services based on the determined security boundaries. In instances where a service is desirable to the home devices 104a-104j, the broadband gateway 102 may communicate the service providers 120 and/or the content providers 130 to request the service for the home devices 104a-104j. The service providers 120 and/or the content providers 130 may encrypt content for the requested service utilizing the corresponding CA information. The resulting encrypted content may be provided to the broadband gateway 102 via the distribution networks 110.

The broadband gateway 102 may distribute or deliver the received encrypted content to the home devices 104a-104j when needed. In this regard, to secure content distribution to one or more devices such as the device 104a, the broadband gateway 102 may determine or select a content distribution security scheme by comparing or matching the CA information associated with the received content with a security profile supported by the device 104a. The determined content distribution security scheme may comprise, for example, super encryption, simul-crypt, secure IP encryption (IPSec) and/or secure watermarking. The broadband gateway 102 may deliver or communicate the received encrypted content to the device 104a utilizing the determined content distribution security scheme.

The broadband gateway 102 may communicate with the various devices via a home network that may comprise wired and/or wireless communication links, such as the home network 100a. In this regard, the broadband gateway 102 may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may be operable to provide energy management by varying the configuration of one or more devices in the home network. The broadband gateway 102 may collect and/or store energy-related information of the devices in the home network and/or of the links in the home network, and may utilize such information to control the operation of the home devices. For example, the broadband gateway 102 may utilize channel capacity flexibility and content coding options to minimize and/or optimize power utilization. The broadband gateway 102 may also configure and/or manage the configuration of the network between the broadband gateway 102 and one or more service/content providers based on the energy-related information associated with the devices in the home. For example, at least a portion of the distribution networks 100 may be configured and/or managed in this manner. The broadband gateway 102 may be utilized to display energy-related metrics, including consumption trends and/or costs, for example, and to display any available credits/rewards that may be redeemed by a user. In some instances, when a device in the home network is a certified device, such as a California efficient display, for example, the broadband gateway 102 may be utilized to provide that information to a service/content provider and obtain rewards/credits associated with the use of such certified devices. Moreover, overall network power consumption may be managed by sharing information among multiple interconnected broadband gateways.

The broadband gateway 102 may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 102 may be utilized to reduce bandwidth and/or processing power consumption in the home network. The broadband gateway 200 may also support and/or use multi-transport processing, which may be performed sequentially, in parallel, and/or utilizing distributed processing.

The gateway functionality associated with a user, such as security features, preferences, applications, electronic programming guides (EPGs), and user profile, for example, may be ported from the broadband gateway 102 to one or more other broadband gateways 102 in other locations. In some instances, a visitor may be allowed access to their content outside their service/content provider service area by, for example, classifying the access level for different users and/or by providing limited access to content. Moreover, the broadband gateway 102 may allow multiple user interface software structures by, for example, standardizing an interface to service/content providers and devices in the home network.

The broadband gateway 102 may be operable to broker and/or arbitrate with service/content providers the consumption of certain services, such as music and video, for example. In some instances, the broadband gateway 102 may perform content search, transport discovery, ranking, and/or sorting. These operations may be performed based on content quality, price, quality-of-service (QOS), and network protocols supported by the devices in the home network, such as service level agreements (SLAs), for example.

Various emergency-related services in the home network may be supported by the broadband gateway 102, including allowing first responders to provide alerts to a select group of users by accessing the broadband gateway 102 via secure links provided by the service/content providers. For example, the broadband gateway 102 may enable an emergency service provider, such as those associated with the emergency service provider network 140 described above in FIG. 1, to access one or more devices in the home network.

Customized graphical user interfaces (GUIs) may be generated by the broadband gateway 102, wherein the GUIs may be used to visually display and/or provide interaction with the customized content.

For peer-to-peer communication, the broadband gateway 102 may be utilized to allow enhanced content sharing in a service/content provider network. In this regard, the broadband gateway 102 may be utilized to construct a directory service for peer-to-peer connectivity with friends and family, for example. The broadband gateway 102 may be utilized to provide incentives to users who engage in peer-to-peer communication through, for example, the distribution networks 110. Moreover, the broadband gateway 102 may be utilized to match the content coding to the service type being consumed by the user and to make the necessary allocations through the network with respect to peer-to-peer or conventional Internet programming or broadcast programming.

The broadband gateway 102 may be utilized in connection with constrained network resources, such as time of day, traffic congestion, and the like, for example, to provide incentives for a user to accept a lower cost, lower quality of service that is dynamically configured for current network conditions. In some instances, the broadband gateway 102 may allow enhanced low latency service delivery to client devices in a home network.

The broadband gateway 102 may be operable to run or execute an agent to extract content, rating, copyright, language, privacy rules, and automatically add user generated content, for example. Such agent may be run or executed in connection with the processor module 204 of the broadband gateway 102, for example. In some instances, the broadband gateway 102 may be operable to provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 102.

The broadband gateway 102 may be operable to combine and/or blend multiple contents for use as single content in the home network. Such combination may be performed in one or more of the modules of the broadband gateway 102. For example, the broadband gateway 102 may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 102. Only when a user authorizes the transfer of the confidential data will such data be stored and/or aggregated. The broadband gateway 102 may be operable to create a trusted rating mechanism for content. The broadband gateway 102 may be secure against external threats that may be downloaded from outside the home network and may provide a secure domain distribution in the home network. Automated and secured billing and payment services may also be provided by the broadband gateway 102.

The broadband gateway 102 may be operable to utilize client or home device profile information to select layered video service(s) and/or transmission. Such information may be stored, at least temporarily, in the memory module 206 of the broadband gateway 102. In some instances, the programming and/or enhanced video layers received by the broadband gateway 102 may be aggregated midstream by one or more network or routing nodes.

The broadband gateway 102 may support a reduction in the cost of unwatched content by using multi-tier billing for downloaded content, such as video content. The broadband gateway 102 may be utilized to provide a unified payment portal for collecting and/or aggregating charges from multiple service and/or content providers.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a home network interface module 208. In some instances, the broadband gateway 102 may be such that the various modules listed above may be distributed over multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data from and/or send data to one or more service/content providers via one or more physical layer connections 130 to one or more network access service providers. In this regard, each of the physical layer connections $130_1$-$130_j$ may connect the gateway 110 to a difference network access service provider. Each of the physical layer connections 130 may comprise a wired, optical, or wireless connection. Each of the physical layer connections 130 may utilize different physical media and/or different physical layer protocols. For example, the connection $130_1$ may comprise a DSL over twisted-pair connection and the connection $130_j$ may comprise a CATV over coaxial cable connection.

The processor module 204 may comprise suitable logic, circuitry, code, and/or interfaces that may be operable to process data received from the service/content providers and/or data received from one or more devices 104 in the home.

Data received from the service/content providers via one or more physical layer connections $210_1$-$210_j$ may be processed to make it suitable for communication to a device such as the device 104a and data from the one or more devices 104 may be processed to make it suitable for communication to the service/content providers via one or more physical layer connections $210_1$-$210_j$. In this regard, the processor module 204 may comprise one or more portions that are suitable to handle communication or interactions between the plurality of service providers 120 and/or the plurality of content providers 130, and the devices 104. For example, the processor module 204 may determine or update associated security boundaries by discovering or monitoring security profiles supported by the devices 104.

The processor module 204 may negotiate CA information with the service providers 120 and/or the content providers 130 via the provider interface module 202 so as to subscribe the broadband gateway 102 for corresponding services based on the determined security boundaries. In instances where a service request is received from the one or more devices 104 via the home network interface module 208, the processor module 204 may communicate with the service providers 120 and/or the content providers 130 via the provider interface module 202 for the requested service. Content for the requested service may be encrypted by the service providers 120 and/or the content providers 130 utilizing the corresponding CA information negotiated with the broadband gateway 102. The encrypted content may be delivered or communicated to the broadband gateway 102 via the distribution networks 110.

The broadband gateway 102 may distribute or provide the received encrypted content to the home devices 104a-104j via the home network interface, module 208 when needed. A content distribution security scheme such as, for example, super encryption, simul-crypt, IPSec and/or secure watermarking, may be selected for each of the devices 104 by comparing or matching the CA information associated with the received encrypted content with corresponding security profiles for the devices 104. The received encrypted content may be delivered or communicated via the home network interface module 208 to the devices 104 utilizing the corresponding determined content distribution security schemes.

The processor module 204 may comprise secure module 205 incorporated for a desired service. The secure module 205 may be a removable CA card or downloadable software. The secure module may comprise a service profile comprising security features or requirements for the desired service. The processor module 204 may be operable to determine security boundaries such as, for example, conditional access, digital right management, link protection, authentication, device intrusion based on the security profile for the security module 205. The determined security boundaries may be applied to the network, the broadband gateway 102 and associated devices 104. The secure module 205 may be utilized to automatically configure content routing and secure content distribution for the desired service in the home network 110a. In this regard, the secure module 205 may be operable to process content for the desired service for one or more devices 104 based on the corresponding determined security boundaries. The resulting processed content may be communicated to the one or more devices 104 according to the corresponding determined security boundaries.

The processor module 204 may also be operable to generate a graphical user interface (GUI) which may be manipulated via which a user may provide input. The GUI may be displayed as part of an OSD on a local device 104, such as a monitor or television, and may be manipulated via a remote control and/or other input device that communicates directly with the broadband gateway 102. The GUI may be a web-based interface, and a user may interact with it via a computer and web browser. The GUI may be customized based on characteristics of the broadband gateway 102, the device 104 coupled to the broadband gateway 102, and the service and/or content providers associated with the broadband gateway 102. The processors module 204 may utilize the memory 206 in performing its functions.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media that may be integrated in the broadband gateway 102 and/or may be removable such as a removable storage device.

The home network interface module 208 may comprise suitable logic, circuitry, code, and/or interfaces that may be operable to receive data from and/or send data to one or more devices in the home network. The home network interface module 208 may be operable to support multiple communication protocols, standards, and/or data transport technologies. In this regard, the home network interface module 208 may handle one or more physical layer connections to one or more devices 104. For example, the home network interface module 208 may comprise, one or more wired and/or wireless Ethernet interfaces, one or more analog and/or digital audio outputs, one or more audio/video interfaces such as such as HDMI and DisplayPort, 60 GHz WiGig wireless connection/interface, one or more USB interfaces, one or more IEEE 1394, and/or one or more telephone jacks.

In operation, a request for content may be received from a device 104 via the home network interface module 208 and the processor module 204 may determine whether to grant the request. In instances that the request is granted, the processor module 204 may handle communication or interactions between the service providers 120 and/or the plurality of content providers 130, and the devices 104. In various embodiments of the invention, security boundaries associated with the broadband gateway 102 may be determined or updated by monitoring security profiles supported by the corresponding devices 104.

A security profile for a device such as the device 104a may be configured and managed locally by user and/or remotely by associated networks. The security profile for the device 104a may specify security levels or security parameter settings for security functions employed within the device 104a. The security levels or security parameters may comprise encryption preferences, compression preference, device password, application or resource password, access control to applications and resources, access control to the device, integrity protection against hackers and traps, file encryption options, port protection, communication protection (i.e., send and receive), ability to use wireless connections like Wi-Fi, 802.11, Bluetooth, controlling the content of the device 104a like restricting installing of some applications. The broadband gateway 102 may determine or create the security boundaries based on the overall security profiles supported by the devices 104 served by the broadband gateway 102. The broadband gateway 102 may be operable to manage, modify and/or enforce the determined security boundaries by monitoring activities on both networks and associated devices 104.

The processor module 204 may negotiate CA information with the service providers 120 and/or the content providers 130 via the provider interface module 202 to subscribe corresponding services based on the determined security boundaries.

In instances where the processor module 204 receives a service request from the devices 104 via the home network interface module 208, the processor module 204 may communicate with the service providers 120 and/or the content providers 130 via the provider interface module 202 for the requested service. Upon receiving the service request from the broadband gateway 102, the service providers 120 and/or the content providers 130 may be operable to encrypt content for the requested service utilizing the corresponding CA information, which may be negotiated between the service providers 120 and/or the content providers 130, and the broadband gateway 102 for the requested service. The encrypted content may be delivered or communicated to the broadband gateway 102 via the distribution networks 110. The processor module 204, when needed, may distribute or communicate the received encrypted content to the home devices 104a-104j via the home network interface module 208. In this regard, the processor module 204 may be operable to compare or match the CA information associated with the received content with corresponding security profiles for the devices 104. Content distribution security schemes may be determined or selected for the corresponding devices 104 based on the comparison. The selected content distribution security schemes may comprise super encryption, simul-crypt, IPSec and/or secure watermarking. The processor module 204 may distribute or communicate the received encrypted content to the devices 104 utilizing the corresponding selected content distribution security schemes.

For each desired service, a specific secure module such as the secure module 205 may be integrated or incorporated into the processor module 204. Security boundaries such as, for example, conditional access, digital right management, link protection, authentication, device intrusion, may be determined based on a security profile associated with the security module 205. The processor module 204 may be operable to automatically configure content routing and secure content distribution, via the secure module 205, for the desired service in the home network 110a. In this regard, the secure module 205 may process content for the desired service based on the corresponding determined security boundaries. The resulting processed content may be communicated or distributed to the devices 104 according to the corresponding determined security boundaries.

Figure 3:
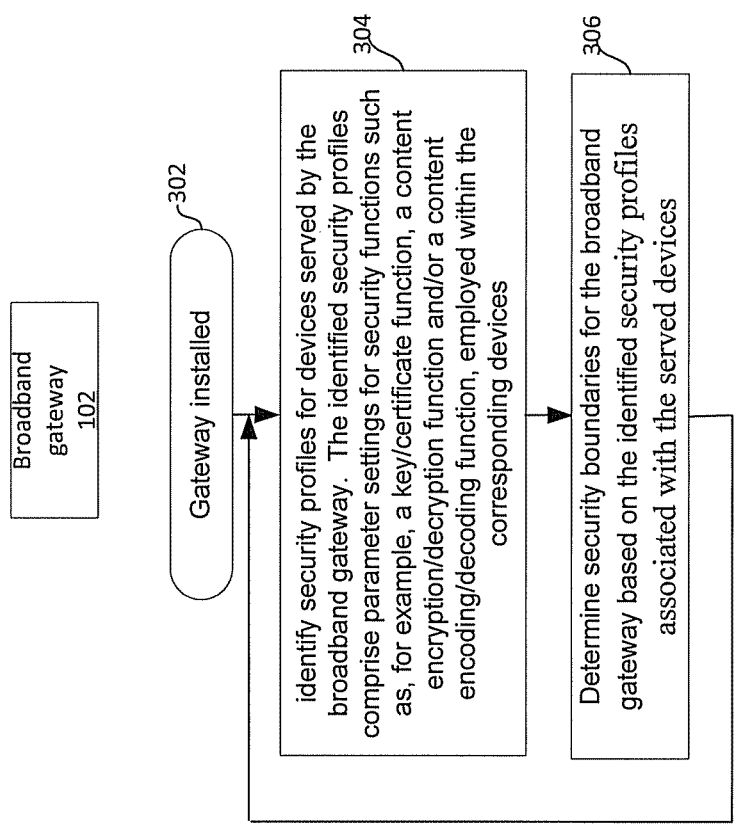
FIG. 3 is a flow chart illustrating exemplary steps that may be performed by a broadband gateway to determine associated security boundaries in a home network for conditional access to services, in accordance with an embodiment of the invention.

FIG. 3 is a flow chart illustrating exemplary steps that may be performed by a broadband gateway to determine associated security boundaries in a home network for conditional access to services, in accordance with an embodiment of the invention. Referring to FIG. 3, the exemplary steps may begin with step 302, in which a broadband gateway 102 may interface with the devices 104 and the service/content providers via the distribution network(s) 110. In step 304, the broadband gateway 102 may identify security profiles associated with one or more intended devices such as the devices 104 served by the broadband gateway 102. The security profiles may be identified by the broadband gateway 102 in various ways. For example, the broadband gateway 102 may identify or discover a security profile for the device 104a through signaling from the device 104a. The broadband gateway 102 may also identify the security profile for the device 104a by learning traffic behavior such as past or current traffic types and/or traffic patterns between the associated networks and the device 104a. In step 306, the broadband gateway 102 may be operable to determine associated security boundaries based on the identified security profiles supported by the devices 104. The exemplary steps may return to the step 304 to continue tracking or monitoring security profiles for the devices 104 and thereby updating security boundaries associated with the broadband gateway 102.

Figure 4:
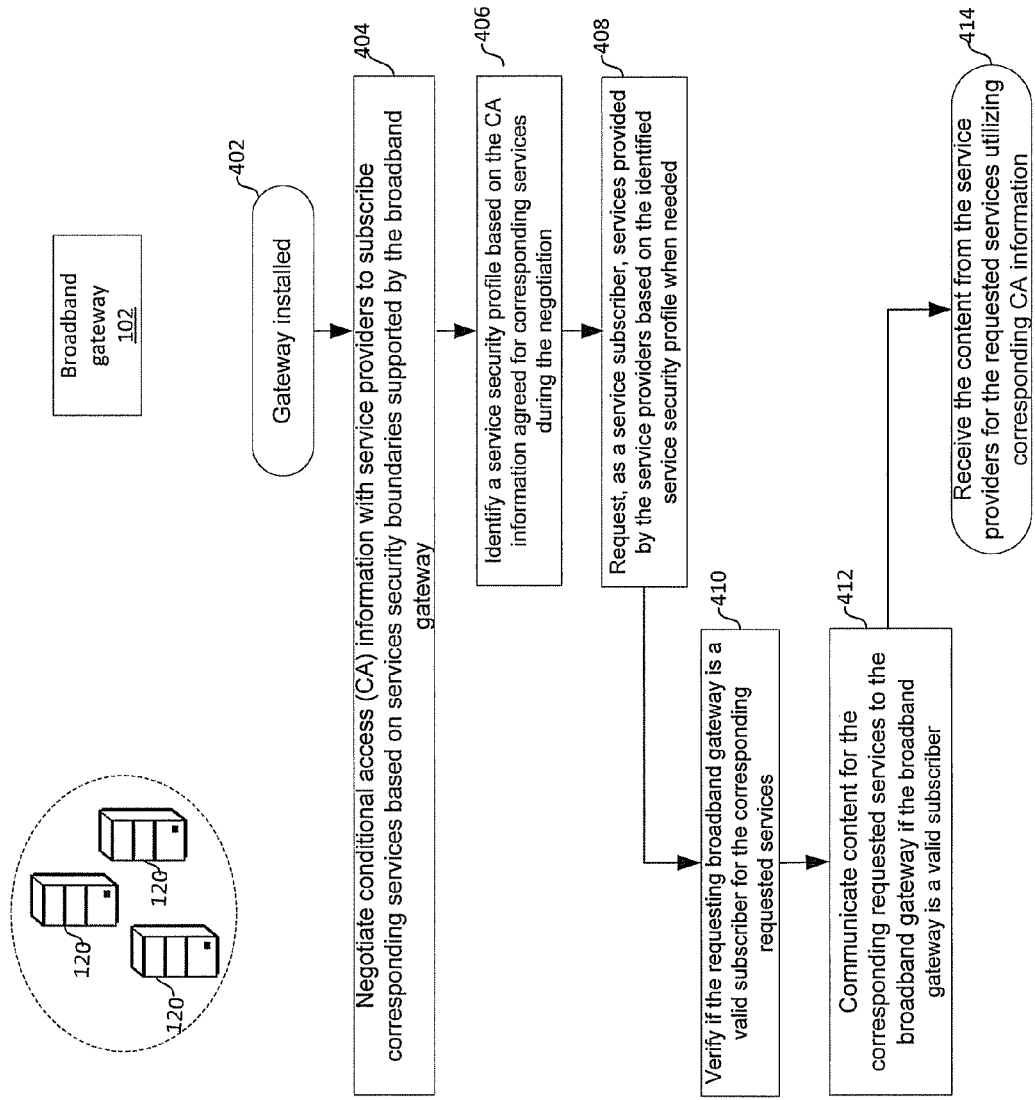
FIG. 4 is a flow chart illustrating exemplary steps that may be performed by a broadband gateway to negotiate conditional access to services provided by service providers, in accordance with an embodiment of the invention.

FIG. 4 is a flow chart illustrating exemplary steps that may be performed by a broadband gateway to negotiate conditional access to services provided by service providers, in accordance with an embodiment of the invention. Referring to FIG. 4, the exemplary steps may begin with step 402, in which a broadband gateway 102 may interface with the devices 104 and the service/content providers via the distribution network(s) 110. In step 404, the broadband gateway 102 may negotiate, based on the associated services security boundaries, conditional access (CA) information with the content providers 130 and/or the service providers 120 in order to subscribe corresponding services. In step 406, the broadband gateway 102 may be operable to identify or determine a service security profile comprising CA information agreed for the corresponding services. In step 408, in instances when a service is desired or expected by one or more served devices 104, the broadband gateway 102 may be operable to communicate the content providers 130 and/or the service providers 120 to request, as a service subscriber, the service based on the identified service security profile. In step 410, the content providers 130 and/or the service providers 120 may be operable to verify whether the broadband gateway 102 is a valid subscriber for the requested service. In step 412, the content providers 130 and/or the service providers 120 may encrypt content for the requested service utilizing the corresponding CA information negotiated with the broadband gateway 102. The encrypted content for the requested service may be delivered or communicated to the broadband gateway 102 via the distribution network(s) 110. In step 414, the broadband gateway 102 may receive or decrypt the encrypted content received from the content providers 130 and/or the service providers 120 utilizing the corresponding CA information for the requested service.

Figure 5:
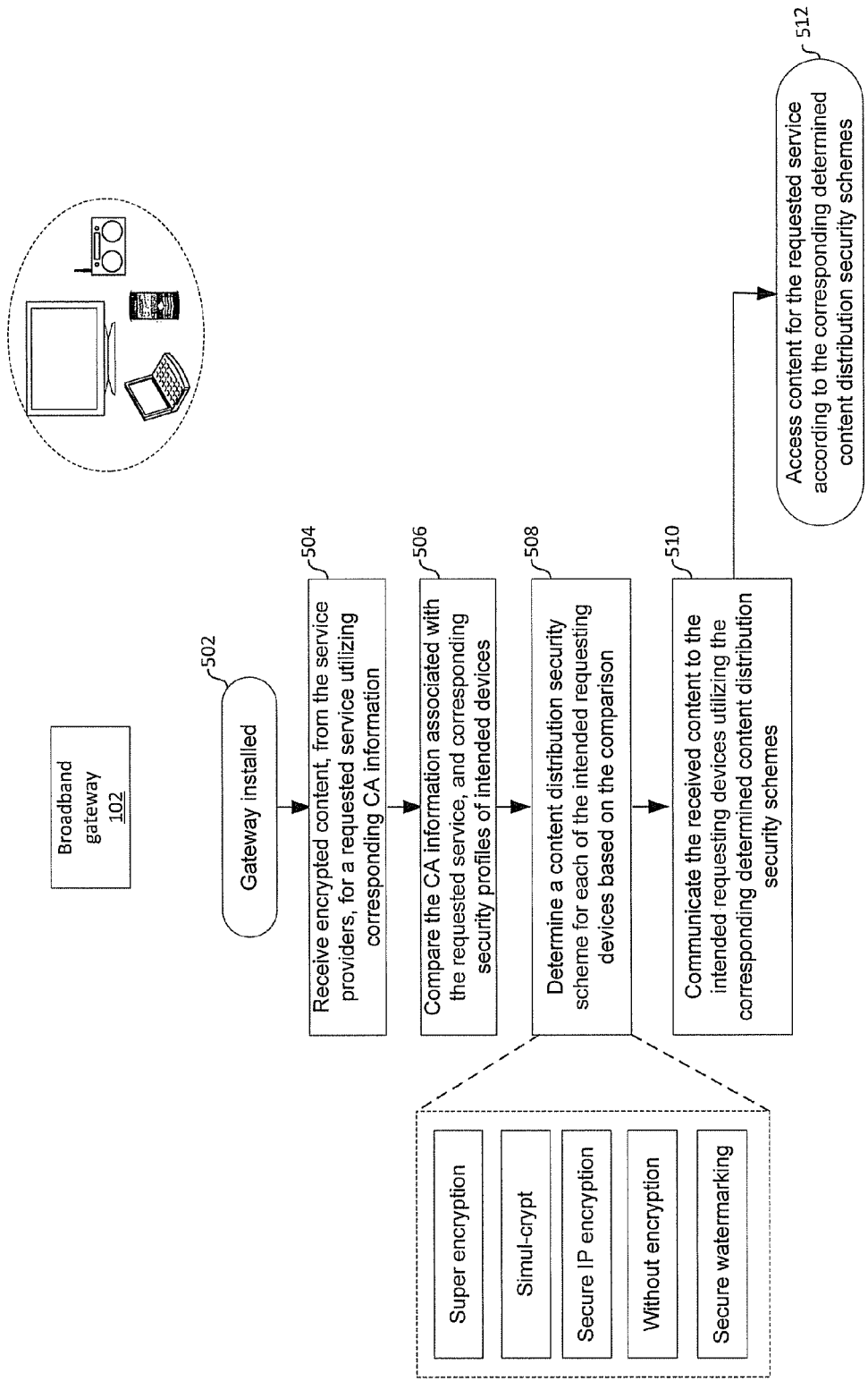
FIG. 5 is a flow chart illustrating exemplary steps that may be performed by a broadband gateway to secure content distribution in a home network, in accordance with an embodiment of the invention.

FIG. 5 is a flow chart illustrating exemplary steps that may be performed by a broadband gateway to secure content distribution in a home network, in accordance with an embodiment of the invention. Referring to FIG. 5, the exemplary steps may begin with step 502, in which a broadband gateway 102 may interface with the devices 104 and the service/content providers via the distribution network(s) 110. In step 504, the broadband gateway 102 may be operable to receive encrypted content, from the service providers, for a requested service utilizing corresponding CA information. In step 506, the broadband gateway 102 may be operable to compare or match the CA information associated with the requested service, with corresponding security profiles for the devices 104. In step 508, the broadband gateway 102 may determine a content distribution security scheme for each of the devices 104 based on the comparison. The determined content distribution security schemes may comprise various secure content distribution mechanisms such as, for example, super encryption, simul-crypt, IPSec and/or secure watermarking. In step 510, the broadband gateway 102 may communicate the received encrypted content to the devices 104 utilizing the corresponding determined content distribution security schemes. In step 512, the devices 104 may be operable to receive or decrypt the content received from the broadband gateway 104 according to the corresponding determined content distribution security schemes.

Figure 6:
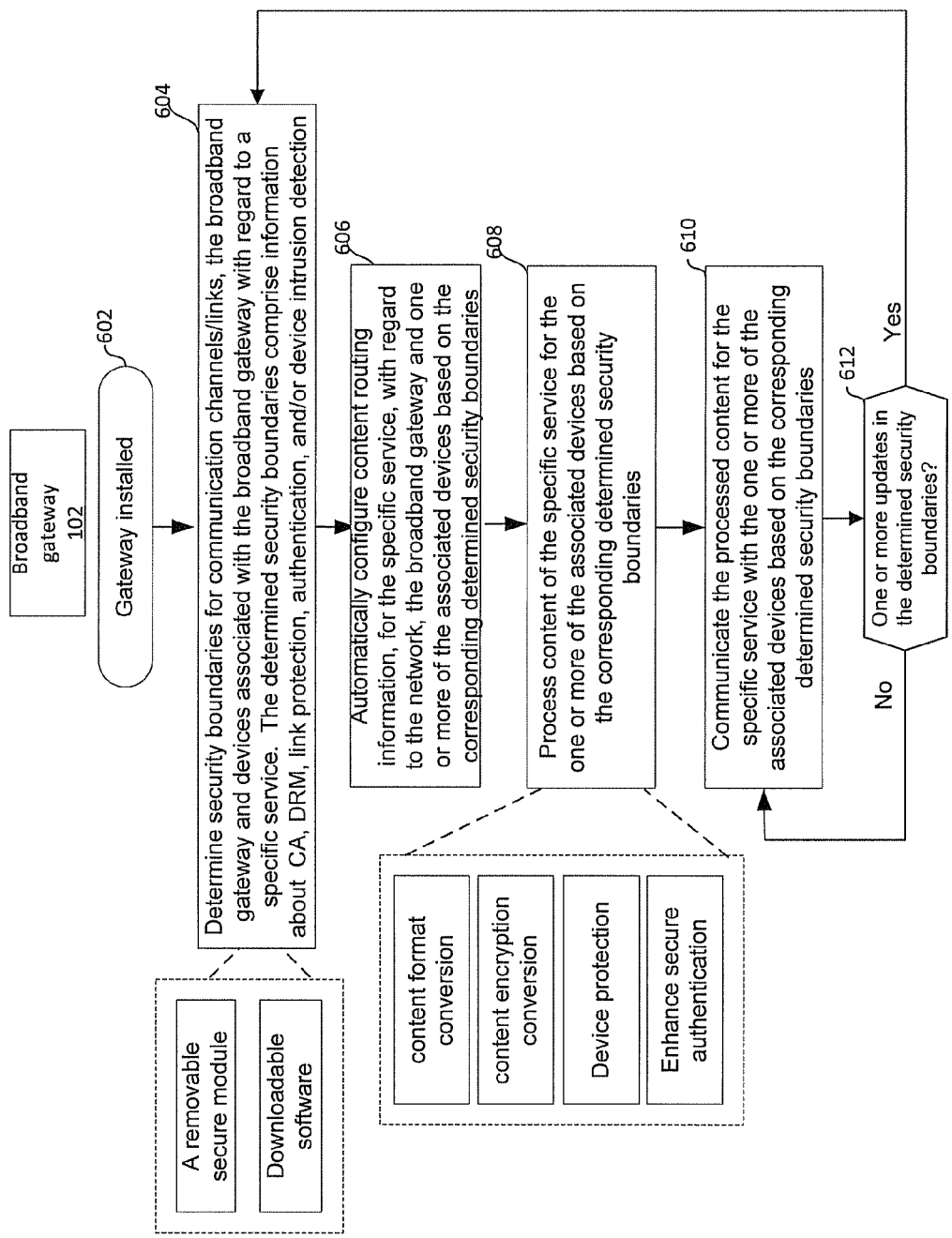
FIG. 6 is a flow chart illustrating exemplary steps that may be performed by a broadband gateway to dynamically configure and secure content distribution in a home network, in accordance with an embodiment of the invention.

FIG. 6 is a flow chart illustrating exemplary steps that may be performed by a broadband gateway to dynamically configure and secure content distribution in a home network, in accordance with an embodiment of the invention. Referring to FIG. 6, the exemplary steps may begin with step 602, in which a broadband gateway 102 may interface with the devices 104 and the service/content providers via the distribution network(s) 110. The broadband gateway 102 may comprise a removable secure module such as a Card Authenticator (CA) card and/or downloadable security software for a given service. In step 604, based on a security profile associated with the incorporated security module for the given service, the broadband gateway 102 may determine security boundaries such as, for example, CA, DRM, link protection, authentication, device intrusion for its own, the devices 104 and/or connections or links between the broadband gateway 102 and the devices 104. In step 606, the broadband gateway 102 may be operable to communicate with the devices 104 and the content providers 130 and/or the service providers 120 to automatically configure content routing information for the given service based on the determined security boundaries.

In step 608, the broadband gateway 102 may process content of the given service for one or more devices 104 based on the corresponding determined security boundaries. In various embodiments of the invention, the broadband gateway 102 may process the content for the given service to fit different devices. For example, the broadband gateway 102 may convert the received content into, for example, MPEG-2 video, AVC video and/or RealVideo, to serve corresponding devices. The broadband gateway 102 may also operable to support different encryption schemes and/or algorithms for content delivery. For example, in some circumstances, the broadband gateway 102 may utilize AES for content from the network and/or service providers and utilize a different encryption scheme and/or algorithm such as 3DES to deliver content to the devices 104. In addition, the broadband gateway 102 may process the content in a way to compatible to or fit corresponding device protection or interface configuration such as protected PCI or USB, and/or device memory protection. The broadband gateway 102 may support various content distribution security schemes such as, for example, super encryption, simul-crypt, IPSec and/or secure watermarking.

In step 610, the broadband gateway 102 may communicate the processed content to the corresponding devices 104 based on the corresponding determined security boundaries. In step 612, it may be determined whether one or more updates are identified in the determined security boundaries. In instances where one or more updates or changes are identified in the determined security boundaries, then the exemplary steps may return to step 604. Otherwise, the exemplary steps may return to step 610.

Various aspects of a method and system for secure content distribution by a broadband gateway are provided. In various exemplary embodiments of the invention, a broadband gateway 102, which enabled communication with a plurality of devices 104, is operable to handle at least one physical layer connection to at least one corresponding network access service provider. The at least one physical layer connection may comprise a plurality of physical layer connections such as the physical layer connections $210_1$-$210_J$, and the at least one corresponding network access service provider may comprise a plurality of corresponding access service providers such as the service providers 120 and/or the content providers 130. Each of the plurality of physical layer connections $210_1$-$210_J$ corresponds to a respective one of the plurality of corresponding access service providers. The broadband gateway 102 may be operable to identify associated security boundaries based on security profiles supported by the plurality of devices such as the devices 104, and a service profile associated with a service provided by service providers or networks.

The identified security boundaries may be utilized by the broadband gateway 102 to determine or negotiate conditional access information for the service.

The broadband gateway 102 may receive content for the services utilizing the corresponding determined conditional access information. The received content may be distributed to the devices 104 based on the determined condition access information and the corresponding security profiles supported by the corresponding devices 104. A security profile for a device such as the device 104a may specify or comprise a security level for each security function employed within the device 104a. A plurality of security functions such as, for example, a key/certificate function, a content encryption/decryption function and/or a content encoding/decoding function, may be employed or implemented within the device 104a.

The broadband gateway 102 may be dynamically configured based on associated security boundaries to secure content distribution in the home network. The security boundaries for the broadband gateway 102 may comprise boundary information on, for example, conditional access, digital right management, link protection, authentication, and/or device intrusion. The broadband gateway 102 may be automatically configured in response to updates or changes in the associated security boundaries.

Depending device configuration, each security function within the device 104a may be associated with a different security level. The identified security boundaries for the broadband gateway 102 may be utilized by the broadband gateway 102 to negotiate conditional access information for the service provided by the at least one network access service provider. Content distribution security schemes may be determined for the corresponding devices 104 by comparing or matching the CA information with the corresponding security profiles for the devices 104. The determined content distribution security schemes may comprise, for example, super encryption, simul-crypt, secure IP encryption (IPSec) and secure watermarking. The broadband gateway 102 may distribute the received content to the devices 104 utilizing the corresponding determined content distribution schemes. The devices 104 may receive or decrypt the distributed content based on the corresponding determined content distribution security schemes, accordingly.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for secure content distribution by a broadband gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in a broadband gateway that enables communication with a plurality of devices, wherein said broadband gateway is operable to handle at least one physical layer connection to at least one network access service provider:
   determining a security boundary for at least one of said plurality of devices based in part on a security profile associated with said at least one of said plurality of devices;
   negotiating, with said at least one network access service provider, conditional access information for a service provided by said at least one network access service provider based on said security boundary;
   receiving content for said service utilizing said conditional access information;
   determining a content distribution security scheme for distributing said content to said at least one of said plurality of devices by comparing said conditional access information with said security profile associated with said at least one of said plurality of devices; and
   distributing said content to said at least one of said plurality of devices based on said content distribution security scheme.

2. The method according to claim 1, wherein said security profile comprises a security level for at least one of a plurality of security functions.

3. The method according to claim 2, wherein:
   said plurality of security functions comprise at least one of a key management function, a certificate management function, a content encryption function, a content decryption function, a content encoding function, or a content decoding function; and
   said security boundary comprises a boundary on at least one of conditional access, digital right management, link protection, authentication, or device intrusion.

4. The method according to claim 1, comprising dynamically configuring said broadband gateway for said service based on said security boundary.

5. The method according to claim 1, comprising automatically configuring said broadband gateway in response to one or more updates for said security boundary.

6. The method according to claim 1, comprising:
   determining a security boundary for each of said plurality of devices, each security boundary being based in part on a security profile associated with a respective one of said plurality of devices, wherein negotiating said conditional access information further comprises, for each security boundary, negotiating with said at least one network access service provider, to determine said conditional access information for said service.

7. The method according to claim 6, comprising:
   comparing said conditional access information for said service with said security profiles associated with said plurality of devices; and
   determining a content distribution security scheme for each of said plurality of devices based on said comparing.

8. The method according to claim 7, wherein each said content distribution security scheme comprises at least one of super encryption, simul-crypt, secure IP encryption (IPSec), or secure watermarking.

9. The method according to claim 8, comprising distributing said content to said plurality of devices utilizing said content distribution security schemes for said plurality of devices.

10. A system for networking, the system comprising:
    one or more circuits for use in a broadband gateway that enables communication with a plurality of devices, wherein said broadband gateway is operable to handle at least one physical layer connection to at least one network access service provider, said one or more circuits being operable to:
    determine a security boundary for at least one of said plurality of devices based in part on a security profile associated with said at least one of said plurality of devices;
    negotiate, with said at least one network access service provider, conditional access information for a service provided by said at least one network access service provider based on said security boundary;
    receive content for said service utilizing said conditional access information;
    determine a content distribution security scheme for distributing said content to said at least one of said plurality of devices by comparing said conditional access information with said security profile associated with said at least one of said plurality of devices; and
    distribute said content to said at least one of said plurality of devices based on said content distribution security scheme.

11. The system according to claim 10, wherein said security profile comprises a security level for at least one of a plurality of security functions.

12. The system according to claim 11, wherein:
    said plurality of security functions comprise at least one of a key management function, a certificate management function, a content encryption function, a content decryption function, a content encoding function, or a content decoding function; and
    said security boundary comprises a boundary on at least one of conditional access, digital right management, link protection, authentication, or device intrusion.

13. The system according to claim 10, wherein said one or more circuits are operable to dynamically configure said broadband gateway for said service based on said security boundary.

14. The system according to claim 10, wherein said one or more circuits are operable to configure said broadband gateway in response to one or more updates for said security boundary.

15. The system according to claim 10, wherein said one or more circuits are operable to:
  determine a security boundary for each of said plurality of devices, each security boundary being based in part on a security profile associated with a respective one of said plurality of devices; and
  for each security boundary, negotiate with said at least one network access service provider to determine said conditional access information for said service.

16. The system according to claim 15, wherein said one or more circuits are operable to:
  compare said conditional access information for said service with said security profiles associated with said plurality of devices; and
  determine a content distribution security scheme for each of said plurality of devices based on said comparison.

17. The system according to claim 16, wherein each said content distribution security scheme comprises at least one of super encryption, simul-crypt, secure IP encryption (IPSec), or secure watermarking.

18. The system according to claim 17, wherein said one or more circuits are operable to distribute said content to said plurality of devices utilizing said content distribution security schemes for said plurality of devices.

19. A method for networking, the method comprising:
  in a broadband gateway that enables communication with a plurality of devices:
    identifying a security profile associated with said at least one of said plurality of devices;
    negotiating, with at least one network access service provider, conditional access information for a service provided by said at least one network access service provider based on said security profile;
    receiving content for said service utilizing said conditional access information;
    determining a content distribution security scheme for distributing said content to said at least one of said plurality of devices by comparing said conditional access information with said security profile; and
    distributing said content to said at least one of said plurality of devices based on said content distribution security scheme.

20. The method of claim 19, comprising:
  when negotiating said conditional access information for said service, downloading security software for said service;
  monitoring said security profile associated with said at least one of said plurality of devices; and
  adapting a subscription to said service for said at least one of said plurality of devices based on said monitoring.

21. The method of claim 1, comprising:
  monitoring said security profile associated with said at least one of said plurality of devices; and
  updating said security boundary based on said monitoring.

22. The system according to claim 10, wherein said one or more circuits are operable to monitor said security profile associated with said at least one of said plurality of devices and update said security boundary.

* * * * *